Oct. 7, 1952     D. R. BLUMER     2,613,233
METHOD FOR PRODUCING UNSATURATED HYDROCARBONS
Filed Dec. 28, 1948     2 SHEETS—SHEET 2

INVENTOR.
DONALD R. BLUMER
BY Hudson and Young
ATTORNEYS

Patented Oct. 7, 1952

2,613,233

UNITED STATES PATENT OFFICE 2,613,233

METHOD FOR PRODUCING UNSATURATED HYDROCARBONS

Donald R. Blumer, St. Paul, Minn., assignor to Phillips Petroleum Company, a corporation of Delaware Application December 28, 1948, Serial No. 67,673

15 Claims. (Cl. 260—677)

This invention relates to a process for the production of unsaturated hydrocarbons from diisopropyl. In one of its aspects this invention relates to the production of mono-olefinic hydrocarbon derivatives of diisopropyl by the chlorination of diisopropyl and dehydrochlorination of the chlorinated products. This invention is useful for the production of tetramethylethylene by the chlorination of diisopropyl and dehydrochlorination of the monochlorides thus produced.

Mono-olefinic hydrocarbon derivatives of diisopropyl, such as tetramethylethylene, are valuable compounds for the production of higher-boiling hydrocarbons and especially those hydrocarbons that are highly desirable in gasoline. For example, tetramethylethylene may be methylated to produce triptane which is a highly valuable hydrocarbon. Thus the value of producing these mono-olefinic derivatives of diisopropyl is quite readily apparent.

It is an object of this invention to produce mono-olefinic hydrocarbon derivatives of diisopropyl.

It is another object of this invention to produce tetramethylethylene.

Another object of this invention is to produce valuable unsaturated derivatives of diisopropyl by the chlorination of diisopropyl and dehydrochlorination of the monochlorides thus produced.

A further object of this invention is to provide a novel process for the production of tetramethylethylene which involves chlorination of diisopropyl, dehydrochlorination of the resulting monochlorides and isomerization of the byproduct olefinic hydrocarbons to the desired product.

A further object of this invention is to provide a novel process for the production of tetramethylethylene which involves chlorination of diisopropyl, separating the tertiary chloride derivative from the primary chloride derivative, dehydrochlorinating each chlorinated derivative and isomerizing the by-product olefins to the desired product.

Further and additional objects of my invention will be apparent from the description hereinbelow.

My invention can be readily understood by reference to the accompanying drawings which are flow diagrams of suitable methods for carrying out my process. Such conventional equipment as pumps, compressors, etc. have not been included in the diagrams in order to facilitate the understanding of my invention.

Figure 1:
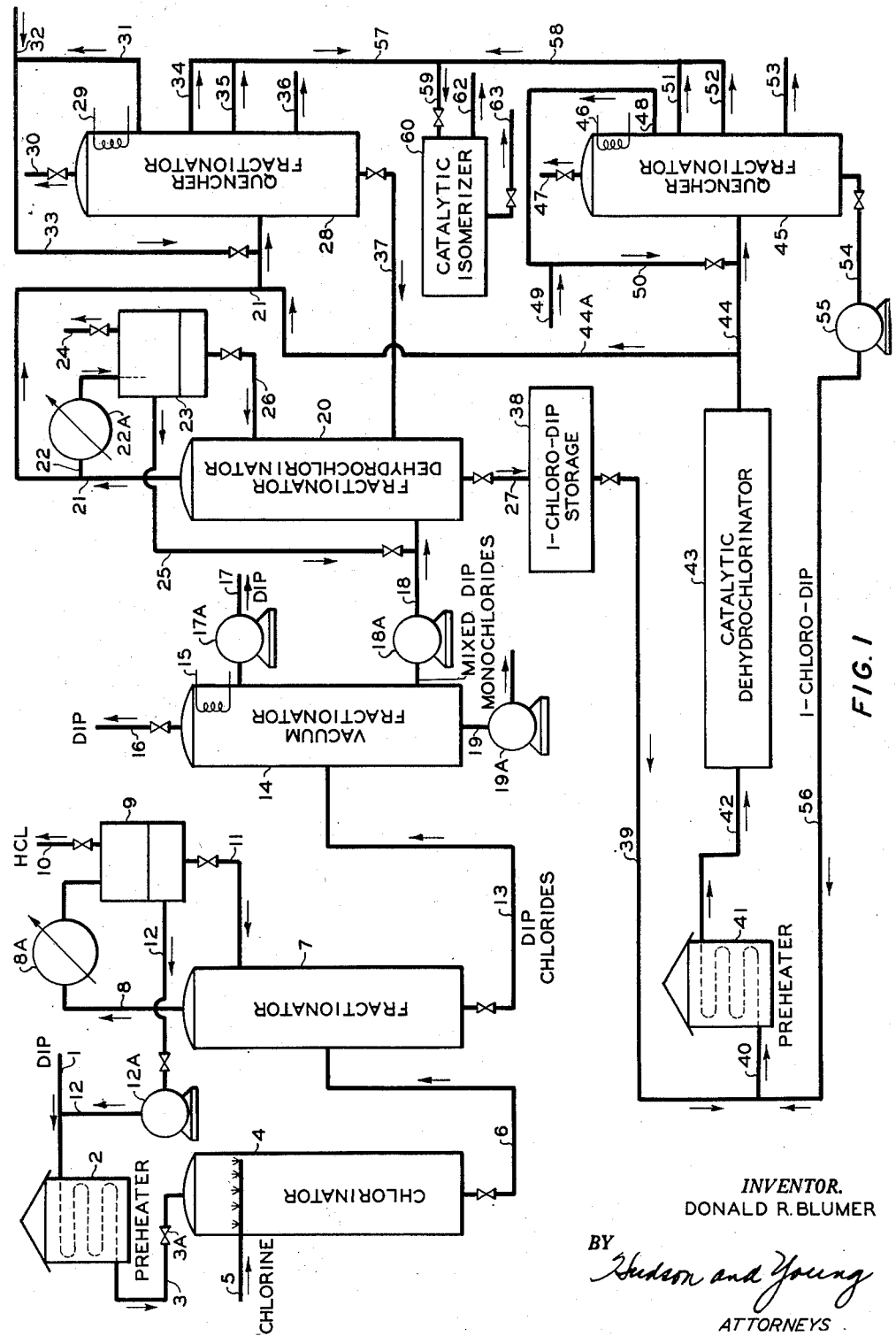

Referring to Figure 1 of the accompanying drawings, 2,3-dimethylbutane, which is ordinarily referred to as diisopropyl or DIP in this specification, is introduced into line 1, wherein it is joined by the diisopropyl distillate from fractionator 7, which is introduced via line 12 and pump 12A. It is ordinarily desirable to use diisopropyl of 98 per cent purity or better as the charge into line 1. However, diisopropyl of lower purity may be used; it may be as low as 90 per cent purity or lower, but these lower purities require additional fractionation steps in the chlorination-dehydrochlorination system in order to remove methylpentanes and other impurities from the diisopropyl recycled to the chlorination step, to remove chlorination products of these impurities from the diisopropyl chlorides, and to separate olefin impurities resulting therefrom from the dehydrochlorination products. The combined diisopropyl stream is passed through preheater 2 wherein it is heated to a temperature approaching its boiling point, preferably in the range of 40 to 55° C., before it is passed into chlorinator 4 through line 3 and check valve 3A which serves to prevent chlorine from backing up into the hydrocarbon line. Chlorine is added to the chlorinator via line 5 into headers which serve to effect multipoint addition of the chlorine to the hydrocarbon. The chlorinator is preferably packed with broken refractory, glass, or other material inert to the action of chlorine, which serves to give good dispersion of the chlorine and hydrocarbon flowing through the reactor and to prevent explosive pockets from forming therein. The hydrocarbon to chlorine molar ratio is ordinarily maintained within the range of 8:1 to 10:1 so that 95 per cent or more of the diisopropyl chlorinated is converted to the monochlorides. With a hydrocarbon to chlorine ratio within the range of 4:1 to 5:1 at the point of introduction of the chlorine, the final chlorinated products contain approximately 90 and 10 mole per cent of the diisopropyl mono- and dichlorides, respectively. With lower ratios than this progressively more di- and trichlorides are formed. Ordinarily, of the monochlorides produced, about 30 to 35 per cent by weight is the teritary derivative and about 65 to 70 per cent by weight is the primary derivative. Because of the fact that the diisopropyl enters chlorinator 4 below its boiling point, substantially all of the heat of the chlorination reaction is absorbed by the excess diisopropyl as heat of vaporization, thereby preventing the reaction temperature from rising dangerously and getting into the explosive range. Under these operating conditions, about 93 per cent or more of the chlorine is utilized in the chlorination reaction. Alternatively, chlorination of the diisopropyl may be carried out in a fractionation column to produce similar results.

I have disclosed the chlorination step using direct chlorination with uncombined chlorine merely as a specific method of effecting the step. Any suitable method, such as catalytic chlorination with sulfuryl chloride, is within the scope of my invention, and I do not intend to limit my process to any one particular method.

The effluent from the chlorinator 4 is passed via line 6 into fractionator 7 wherein the chlorides of diisopropyl are separated as the kettle product and the diisopropyl is condensed out as the overhead product. Hydrogen chloride, a small amount of diisopropyl and traces of unreacted chlorine pass overhead as vapors from fractionator 7 via line 8 and condenser 8A wherein the greater part of the diisopropyl and traces of its chlorides are condensed. This condensate flows into reflux receiver 9 from which reflux is returned through line 11 to fractionator 7. The hydrogen chloride effluent containing traces of unreacted chlorine and small amounts of diisopropyl vapor passes from reflux receiver 9 via line 10 from which it ordinarily is passed into an oil scrubber (not shown) for separation and recovery of the relatively small amounts of diisopropyl vapors contained therein. The product portion of the diisopropyl which is taken off from reflux receiver 9 through line 12 and recycle pump 12A is returned to chlorinator 4 for further processing, and reflux is charged via line 11 to fractionator 7. The diisopropyl chloride products containing a small amount of diisopropyl are taken off from fractionator 7 as the kettle product through line 13 into vacuum fractionator 14. Ordinarily, fractionator 7 is operated at a kettle temperature of 85 to 100° C., and not much in excess thereof by taking off sufficient diisopropyl with the chloride derivatives to keep the temperature within the desired range in order to avoid dehydrochlorination in this column.

In vacuum fractionator 14 the residual diisopropyl is stripped off under vacuum. A cut of the mixed diisopropyl monochlorides is taken off, and the diisopropyl chlorides higher than the monoderivative are removed as kettle product. It is advantageous to operate this column at an absolute pressure of about 5.5 to 6.0 inches of mercury or less so that the kettle temperature will not exceed 100 to 110° C. Then the diisopropyl monochlorides are taken off at a temperature approximately in the range of 55 to 75° C., and appreciable dehydrochlorination during this separation step is avoided. Under these conditions the boiling point of diisopropyl is so low that, unless refrigeration is used in condenser 15, most of the diisopropyl will flash over via line 16 and may be recovered from the vacuum ejector or pump effluent by condensation or oil scrubbing. With refrigeration, much of the diisopropyl is withdrawn via line 17 and pump 17A. If desired the diisopropyl from lines 16 and 17 may be recycled to line 1. The fraction of mixed diisopropyl monochlorides is withdrawn via line 18 and pump 18A and introduced into fractionator-dehydrochlorinator 20 which is operated at about atmospheric pressure. The higher chlorides of diisopropyl are withdrawn via line 19 and pump 19A and may be used for the production of 2,3-dimethylbutadiene-1,3 and other valuable products.

Selective dehydrochlorination of the tertiary diisopropyl monochloride (B. P.=112° C.) is effected by refluxing it in the presence of the higher boiling primary monochloride (B. P.=122° C.) in the fractionator-dehydrochlorinator 20 at about atmospheric pressure, the kettle temperature ordinarily being in the range of 120 to 130° C. This reactor may be packed with refractory, stainless steel, or other suitable rings, saddles, or like packing material. It is advantageous in many cases that the refractory packing be impregnated with small amounts of dehydrochlorination catalyst such as barium chloride, bismuth chloride, or the like in order to accelerate the dehydrochlorination of the tertiary monochloride. Other catalysts which may be used for this purpose are: ferro-molybdenum, phosphor-iron, ferro-manganese, ferro-chrome, ferro-aluminum, nickel-aluminum and the like, wherein the bimetallic couple effect is advantageous in effecting dehydrochlorination. The rare metals such as platinum, palladium, ruthenium, and the like in finely divided state and used in a small quantity on a suitable support such as pumice, kieselguhr (diatomaceous earth), Floridin, or the like are also very effective dehydrochlorination catalysts for use in this fractionator-dehydrochlorinator. The greater part of the dehydrochlorination effluent consisting principally of 2,3-dimethyl-2-butene and smaller concentrations of 2,3-dimethyl-1-butene and 3,3-dimethyl-1-butene and the hydrogen chloride resulting from the dehydrochlorination reaction passes out of the column at a temperature which is ordinarily in the range of 50 to 100° C. via line 21 into the quencher-fractionator 28, wherein a separation is effected. A portion of this effluent is withdrawn from line 21 through line 22 and condenser 22A into reflux receiver 23 from which any desired part of the hydrogen chloride in the effluent can be vented via line 24 or any desired part of it may be recycled via lines 25 and 18 into fractionator-dehydrochlorinator 20 where it serves as a catalyst activator or as a catalyst for the dehydrochlorination reaction. It is in some cases desirable to add traces of moisture or of organic peroxides activated by still smaller amounts of quinone or organic acids at this point to serve as catalysts or promoters for the dehydrochlorination reaction. The condensate from receiver 23 is returned via line 26 to fractionator-dehydrochlorinator 20 as reflux. The 1-chloro-2,3-dimethylbutane remaining after the selective dehydrochlorination step is withdrawn from fractionator-dehydrochlorinator 20 via line 27 into storage reservoir 38.

To the olefin-hydrogen chloride stream entering quencher-fractionator 28 via line 21 is added a diluent which is non-reactive with hydrogen chloride and which is ordinarily lower-boiling than the lowest boiling hexene isomer, 3,3-dimethyl-1-butene (B. P.=41.2° C.) and easily separable therefrom by fractionation. Normal pentane (B. P.=36.0° C.) serves this purpose satisfactorily; however, operation of this separation process is not limited to the use thereof, and other inert diluents may be used. The normal pentane or other diluent dilutes the effluent stream in line 21, causing less intimate contact of the olefins with the hydrogen chloride, and vaporization of the inert diluent in addition tends to sweep the hydrogen chloride out of contact with the olefin-rich liquid phase, thereby retarding back-reaction of the olefin with the hydrogen chloride. In quencher-fractionator 28 the n-pentane and hydrogen chloride are rapidly swept overhead where they contact condenser 29 which serves to return part of the n-pentane as reflux to the column and allows the remaining n-pentane and hydrogen chloride to pass overhead through line 30. This effluent is subsequently put through an oil absorber (not shown) to recover the n-pentane for reuse in the process. The liquid n-pentane separated in the column is taken off via line 31. The recovered and make-up n-pentane are added via line 32 and pass with the n-pentane in line 33 to line 21. The 3,3-dimethyl-1-butene (B. P.= 41.2° C.) is taken off from fractionator 28 via line 34, the 2,3-dimethyl-1-butene (B. P.= 55.6° C.) via line 35, the 2,3-dimethyl-2-butene (B. P.=73.2° C.) via line 36, and conducted to storage, not shown. The small amount of tertiary diisopropyl monochloride which is formed by recombination of hydrogen chloride with the above 2,3-dimethylbutene isomers is withdrawn via line 37 and recycled to fractionator-dehydrochlorinator 20.

The low boiling hexene isomers which are widthdrawn from quencher-fractionator 28 via lines 34 and 35 are passed via line 57 and line 59 into catalytic isomerizer 60 which is preferably constructed as a fractionator, the packing of which may be the isomerization catalyst or suitable refractory or other column packing impregnated with the catalyst. Catalysts which are suitable for this purpose are Floridin, kaolin, diatomaceous earth, bauxite, activated alumina, silica gel, or the like, or the same materials or inert support material such as pumice, impregnated with a slight amount of acid, such as sulfuric or phosphoric, or with acidic sulfate, phosphate, fluoride, or like salts of the alkali, alkaline earth, or other inorganic elements. In this isomerizer, which is preferably operated at total reflux, the vapors are condensed and returned as reflux by means of a cooling coil. The low boiling hexene isomers are catalytically rearranged to 2,3-dimethyl-2-butene and thereby pass down the column and are withdrawn through line 62. They may be conducted to storage (not shown) or admixed with the products in lines 36 and 53, and any high boiling polymers which are formed are withdrawn as kettle residue via line 63.

The 1-chloro-2,3-dimethylbutane from selective dehydrochlorination fractionator 20 passes from storage reservoir 38 via line 39 into line 40 along with the recycle from quencher-fractionator 45 which passes via line 54, recycle pump 55, and line 56 into line 40. Via line 40 the stream flows into preheater 41 and via line 42 into catalytic dehydrochlorinator 43 wherein substantial dehydrochlorination of the primary diisopropyl monochloride is effected. Catalysts such as were cited for use in reactor 20 may be used herein also. The hot dehydrochlorination effluent passes through line 44, and n-pentane or other suitable quenching material is added through line 50 before the cooled effluent passes into quencher-fractionator 45 wherein part of the n-pentane is condensed and returned as reflux by the cooling coil 46. Hydrogen chloride and uncondensed n-pentane vapors pass overhead through line 47 to an oil scrubber (not shown) wherein the n-pentane is recovered by absorbing it in the oil and subsequently flashing it off from the oil. N-pentane or other suitable inert diluent is taken off from column 45 via line 48 and make-up diluent is added via line 49. The n-pentane then passes via line 50 into the stream in line 44. The lower boiling hexene isomers, 3,3-dimethyl-1-butene and 2,3-dimethyl-1-butene are withdrawn from the column through lines 51 and 52, respectively. The 2,3-dimethyl-2-butene is withdrawn through line 53. The undehydrochlorinated 1-chloro-2,3-dimethylbutane residue and a small amount of 2-chloro-2,3-dimethylbutane, which is formed by recombination of hydrogen chloride with the 2,3-dimethylbutene isomers or by rearrangement of the 1-chloro derivative, leaves quencher-fractionator 45 via line 54 and is recycled by pump 55 and line 56. It is advantageous in many cases to subject the liquid passing via line 54 to additional fractionation in order to separate the small amounts of high boiling olefin polymers and highly chlorinated compounds before recycling the diisopropyl monochlorides for further dehydrochlorination.

The low boiling hexene isomers, 3,3-dimethyl-1-butene and 2,3-dimethyl-1-butene, which are taken off through line 51 and 52, respectively, are recycled through line 58 and line 59 to the catalytic isomerizer 60, which has been previously described wherein they are converted to 2,3-dimethyl-2-butene.

In the dehydrochlorination of the 1-chloro-2,3-dimethylbutane, which is effected in catalytic dehydrochlorinator 43, much more rigorous operating conditions are required than were necessary for the selective dehydrochlorination of the 2-chloro-2,3-dimethylbutane in fractionator-dehydrochlorinator 20. Preliminary thermal dehydrochlorination experiments with the primary diisopropyl monochloride in a Pyrex reactor indicated that a temperature of 500–600° C. (932–1112° F.) is required for any significant per pass conversion. In one thermal dehydrochlorination experiment at 609° C. (1128° F.) with a contact time of eight seconds and a mixed monochloride charge containing 95 per cent by weight of the primary derivative a per pass conversion of 79 per cent was attained. An ultimate yield of 64 per cent of theoretical to the two useful 2,3-dimethylbutene isomers, of which about 85 per cent by weight was the 1-olefin, and 36 per cent of theoretical to undesired secondary reaction products was obtained.

Because of the relatively high temperature level required for thermal dehydrochlorination of the primary diisopropyl monochloride and the production of appreciable amounts of waste secondary reaction products, catalytic dehydrochlorination was investigated to see if more satisfactory results could be obtained. A series of ten small scale experiments was made to determine the effectiveness of four catalysts for the dehydrochlorination reaction. Arranged in the order of decreasing initial catalytic activity under comparable experimental conditions these catalysts are as follows: steel turnings, bauxite of low iron content, anhydrous barium chloride, and 18 per cent chromium-8 per cent nickel stainless steel turnings. The steel and the less active stainless steel catalysts rapidly lost their activity with the formation of a film on the surface of the catalyst, although the stainless steel retained its activity better than ordinary steel. The bauxite retained its catalytic activity well but promoted the formation of low-boiling decomposition products and high-boiling polymers. The anhydrous barium chloride produced the highest ultimate yields and did not lose its activity in the experiments. Experimental data for representative dehydrochlorination experiments with the primary diisopropyl monochloride using the barium chloride catalyst are presented in Example 4 hereinbelow.

By passing a mixture of diisopropyl monochlorides containing 97 to 98 per cent by weight of the primary derivative through catalytic dehydrochlorinator 43, containing pumice impregnated with about 10 per cent by weight of anhydrous barium chloride at 520 to 530° C. (968 to 986° F.) and at a space velocity of 0.2 liquid volumes of feed per volume of catalyst per hour and by quenching the effluent with n-pentane in quencher-fractionator 45, a per pass conversion to tetramethylethylene of 60 to 65 per cent and an ultimate yield of 98 to 99 per cent of the theoretical is attained. The olefin product contains a few per cent of 3,3-dimethyl-1-butene; about a third is 2,3-dimethyl-1-butene; the remainder is 2,3-dimethyl-2-butene. Upon isomerization of the first two hexene isomers to 2,3-dimethyl-2-butene in catalytic isomerizer 60, the ultimate conversion to the latter olefin is approximately 95 per cent or better.

Alternatively, in the reaction system illustrated in Figure 1, instead of passing the dehydrochlorination effluents from dehydrochlorinators 20 and 43 into quencher-fractionators 28 and 45, these effluents may be scrubbed concurrently or countercurrently with 1-chloro-2,3-dimethylbutane at a temperature such that substantially all of the 2,3-dimethylbutene isomers are retained in solution, but substantially all of the hydrogen chloride passes through undissolved. A temperature in the range of 35 to 50° C. is ordinarily satisfactory for this purpose. Under these conditions, the 3,3-dimethyl-1-butene isomer which is produced in a relatively small amount is largely swept out with the hydrogen chloride, and it may be separated therefrom by scrubbing preferably with cold 1-chloro-2,3-dimethylbutane or with oil. Subsequently, the solution of olefins in the scrubbing liquid is subjected to fractionation to recover the olefins. In those cases in which appreciable back reaction of the olefins with hydrogen chloride occurs to form the tertiary diisopropyl monochloride and the primary diisopropyl monochloride is used as the scrubbing liquid, it is desirable to recycle part of this scrubbing liquid to fractionator-dehydrochlorinator 20 to selectively dehydrochlorinate the tertiary monochloride formed. A compensating amount of the primary diisopropyl monochloride from this reactor is then recycled back to the scrubbing step as make-up.

Figure 2:
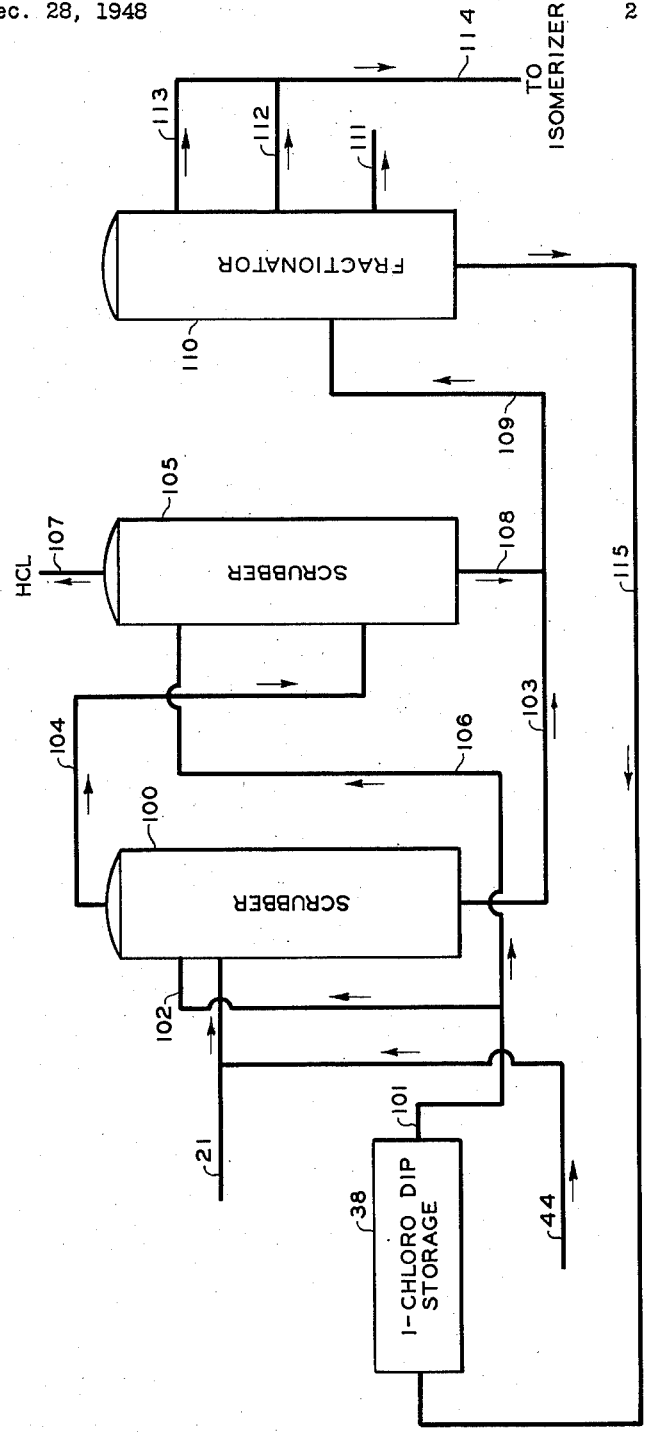

Figure 2 is a diagrammatic drawing of this alternative method of operation. According to this drawing the effluents from dehydrochlorinators 20 and 43, as shown on Figure 1, pass via lines 21 and 44 respectively to scrubber 100. 1-chloro-2,3-dimethylbutane passes from storage 38 via lines 101 and 102 to scrubber 100 wherein it passes concurrently with the effluents from dehydrochlorinator 20 and 43. Scrubber 100 is operated at a temperature of 35 to 50° C., and the scrubbing liquid, 1-chloro-2,3-dimethylbutane, leaves the scrubber via line 103 containing the 2,3-dimethylbutene isomers in solution. Hydrogen chloride and 3,3-dimethyl-1-butene pass from from scrubber 100 via line 104 to scrubber 105. Scrubber 105 is operated at a temperature lower than that of scrubber 100 and within the range of 10 to 25° C. 1-chloro-2,3-dimethylbutane passes from storage 38 via lines 101 and 106 to scrubber 105 where it is used as the scrubbing liquid. At the low temperature in scrubber 105 the hydrogen chloride is separated from the olefin, and the hydrogen chloride leaves scrubber 105 via line 107. The scrubbing liquid containing 3,3-dimethyl-1-butene from scrubber 105 passes via line 108, and the scrubbing liquid and olefins in lines 103 and 108 are combined for passage via line 109 to fractionator 110. From fractionator 110 tetramethylethylene is withdrawn via line 111, and 2,3-dimethyl-1-butene and 3,3-dimethyl-1-butene are withdrawn via lines 112 and 113 respectively. These latter olefins are conveyed via line 114 to an isomerization unit, as described in Figure 1, for conversion to tetramethylethylene. Scrubbing liquid is withdrawn from fractionator 110 via line 115 for return to storage 38.

In another alternative embodiment of the invention quencher-fractionator 45 can be eliminated from the process, and then the effluent from dehydrochlorinator 43 passes via lines 44A and 21 to quencher-fractionator 28 wherein said effluent is treated in the same manner as and along with the effluent from dehydrochlorinator 20, in a manner described hereinabove. In this method of operation 1-chloro-2,3-dimethylbutane in addition to the tertiary diisopropyl monochloride will pass from fractionator 28 to dehydrochlorinator 20 via line 37, and the 1-chloro-2,3-dimethylbutane leaves dehydrochlorinator 20, as previously described, via line 27 for passage to storage 38.

The following specific examples are exemplary of my invention.

Example 1

In a preliminary fractionation which was carried out to separate the primary and tertiary diisopropyl monochloride isomers from a monochloride fraction which resulted from the peroxide catalyzed chlorination of diisopropyl with sulfuryl chloride, it was observed that the tertiary monochloride dehydrochlorinated selectively leaving the primary derivative substantially undehydrochlorinated. This fraction, amounting to 79 grams (88 ml.), which had been previously separated from the chlorination products by means of a one-plate vacuum distillation at a pressure in the range of 7.5 to 9.2 cm. of mercury and at an overhead temperature in the range of 40.5 to 67.5° C. had a corrected boiling range of 102 to 138° C. at 760 mm. mercury, indicating that it contained a slight aomunt of the dichlorides as well as a small amount of lower boiling material. This product was washed with water and dried with calcium chloride prior to redistilling the 73 grams of purified product at atmospheric pressure in a small column, which was packed with $\frac{3}{32}$ inch diameter stainless steel Fenske rings, and which was provided with a water cooled reflux head. During the first distillation, the overhead temperature was 49° C. initially, went up to 120° C., and fell back to 111° C., while the corresponding kettle temperatures were 103, 150 and 299° C., respectively. Considerable hydrogen chloride was evolved with the distillate during the early part of the distillation, but it practically ceased toward the end of the distillation while the primary diisopropyl monochloride was distilling. The dehydrochlorination which was effected in the distillation was catalyzed by the stainless steel packing and the nickel and chromium chlorides formed on the surface thereof.

On redistilling the above distillate, 2,3-dimethyl-1-butene and 2,3-dimethyl-2-butene were separated before dehydrochlorination of the higher boiling kettle products recommenced at a kettle temperature of about 118° C. By redistilling the olefin-diisopropyl monochloride residue fractions twice more and combining and redistilling the kettle residue fractions, the original product was separated into fractions which were principally tetramethylethylene and its isomers and a residue of primary diisopropyl monochloride. Redistillation of the olefin fraction indicated that it contained a trace of 3,3-dimethyl-1-butene and approximately ten volume per cent of 2,3-dimethyl-1-butene. Bromine numbers which were run on the fractions recovered indicated that they were principally olefins.

From the above distillation procedure, about 41 per cent by weight of the original charge of diisopropyl monochloride was recovered as the primary diisopropyl monochloride. The 17 grams of tetramethylethylene and its isomers recovered represents about a 57 per cent of theoretical recovery of olefin from the tertiary monochloride. Much of the tetramethylethylene and its lower boiling isomers was doubtless lost with the hydrogen chloride effluent since no effort was made to chill the effluent with ice traps in order to obtain complete recovery of the olefins.

Example 2

In an experiment designed to prepare pure primary and tertiary diisopropyl monochloride fractions for use in the determination of the physical properties and investigation of the dehydrochlorination of the pure compounds, a composite fraction rich in the monochlorides of diisopropyl was refractionated in all-glass apparatus at reduced pressure, which was in the range of 5.3 to 5.7 inches of mercury absolute pressure. The fractionation column, which was four feet long and had an internal diameter of one-half inch, was packed for a length of approximately forty-four inches with one-eighth inch diameter Pyrex helices. In this refractionation, which was carried out with a high reflux ratio, even at the low overhead temperature, in the range of about 31 to 69° C., 48 grams of tetramethylethylene were formed and recovered from the initial charge, representing a dehydrochlorination of 10 per cent by weight of the initial charge or 29 per cent by weight of the tertiary monochloride content of the charge. From this refractionation and corrections made for dehydrochlorination, it was determined that of the combined monochlorides charged to the distillation, 34 per cent by weight was the tertiary derivative and 66 per cent by weight was the primary derivative. Of the total charge to the column, 4 per cent by weight was the dichlorides of diisopropyl, which had not been removed in the preceding fractionations.

Example 3

Diisopropyl monochlorides produced by the controlled chlorination of diisopropyl with sulfuryl chloride and separated by vacuum fractionation, containing 65 to 70 per cent by weight of the primary derivative and 35 to 30 per cent of the tertiary derivative were continuously treated in a fractionator-dehydrochlorinator 20 to dehydrochlorinate substantially all of the tertiary derivative, leaving the primary derivative substantially unconverted. Reactor 20 was packed with unglazed porcelain impregnated with a small amount of barium chloride. The column overhead temperature was in the range of 50 to 80° C. and the kettle temperature in the range of 120 to 130° C. The olefin product was principally 2,3-dimethyl-2-butene, but it contained 15 to 25 per cent of 2,3-dimethyl-1-butene and a few per cent of 3,3-dimethyl-1-butene. These olefins were separated in quencher-fractionator 28, and the two lower boiling isomers were sent to the catalytic isomerizer 60 for rearrangement to 2,3-dimethyl-2-butene. The over-all conversion of the tertiary diisopropyl monochloride to the latter olefin by these combined processes was 95 per cent of theoretical.

Example 4

In one representative experiment in which mixed diisopropyl monochlorides containing 95 per cent by weight of the primary derivative were passed over anhydrous barium chloride (prepared by dehydration of the dihydrate salt at 200° C. overnight) at 522° C. and at a space velocity of 0.2 liquid volumes of monochlorides per volume of catalyst per hour and in which the effluent was quenched with ice water and the dehydrochlorination effluent was analyzed by fractionation, a per pass conversion of approximately 60 per cent to olefins, and an ultimate yield of 99 per cent of theoretical, was attained. The olefin product was 39 per cent by weight 2,3-dimethyl-1-butene and 61 per cent by weight 2,3-dimethyl-2-butene.

In a second run made under conditions comparable with the above, but with a charge containing 96 per cent by weight of primary diisopropyl monochloride and 4 per cent by weight of the diisopropyl dichlorides, a per pass conversion of approximately 90 per cent to the desired olefins was attained.

In a third run made under similar conditions using a charge of mixed diisopropyl monochlorides containing 39 per cent by weight of the tertiary derivative, the per pass conversion was slightly less than half that attained with the preceding charge.

These differences may have resulted from possible differences in activity of the catalysts used in the three experiments and from selective recombination of the hydrogen chloride with the olefin isomers in the effluent at the quenching temperature of 0° C. which was used. It has been found that 2,3-dimethyl-2-butene reacts much more rapidly with hydrogen chloride at ice temperature than does either 2,3-dimethyl-1-butene or 3,3-dimethyl-1-butene. In the third run, the effluent from dehydrochlorination was richer in 2,3-dimethyl-2-butene than was the effluent from the other two runs prior to the ice water quench, thus permitting more back reaction in this run because the hydrogen chloride had to diffuse or bubble through a relatively deep supernatant hydocarbon layer before dissolving in the water below.

I claim:

1. A process for producing mono-olefinic hydrocarbons which comprises chlorinating 2,3-dimethylbutane under conditions such that monochloride derivatives of said hydrocarbon are the principal reaction products, separating thus produced monochloride derivatives from more highly chlorinated derivatives of said hydrocarbon, separating the primary monochloride derivative from the tertiary monochloride derivative by fractionally distilling the mixture of same at a kettle temperature effecting concomitant selective dehydrochlorination of the tertiary monochloride derivative and distillation of resulting mono-olefinic hydrocarbons and hydrogen chloride as overhead product, and removing liquid unconverted primary monochloride derivative as kettle product.

2. A process for producing mono-olefinic hydrocarbons which comprises chlorinating 2,3-dimethylbutane with a hydrocarbon to chlorine molar ratio within the range of 4:1 to 10:1, separating thus produced monochloride derivatives from more highly chlorinated derivatives of said hydrocarbon, separating the monochloride derivatives by fractionally distilling the mixture of same at a kettle temperature effecting concomitant selective dehydrochlorination of the tertiary monochloride derivative and distillation of resulting mono-olefinic hydrocarbons and hydrogen chloride as overhead product, and removing liquid unconverted primary monochloride derivative as kettle product, and separating from said dehydrochlorination effluent mono-olefinic hydrocarbons.

3. A process for producing tetramethylethylene which comprises chlorinating 2,3-dimethylbutane with a hydrocarbon to chlorine molar ratio within the range of 4:1 to 10:1, separating thus produced monochloride derivatives from more highly chlorinated derivatives of said hydrocarbon, separating the monochloride derivatives by fractionally distilling the mixture of same at a kettle temperature of at least 120° C. effecting concomitant selective dehydrochlorination of the tertiary monochloride derivative and distillation of resulting mono-olefinic hydrocarbons and hydrogen chloride as overhead product, and removing liquid unconverted primary monochloride derivative as kettle product, introducing an inert diluent lower boiling than the lowest boiling hexene isomer to the dehydrochlorination effluent thus produced, and separating from said dehydrochlorination effluent mono-olefinic hydrocarbons.

4. A process according to claim 3 wherein the chlorination reaction is effected at a temperature of 40 to 55° C. and at hydrocarbon to chlorine molar ratios within the range of 8:1 to 10:1.

5. A process according to claim 3 wherein the dehydrochlorination effluent is separated into its respective components by fractionation in the presence of normal pentane as a diluent.

6. A process for producing tetramethylethylene which comprises chlorinating 2,3-dimethylbutane with a hydrocarbon to chlorine molar ratio within the range of 4:1 to 10:1, separating thus produced monochloride derivatives from more highly chlorinated derivatives of said hydrocarbon, separating the primary monochloride derivative from the tertiary derivative by fractionation at a kettle temperature of from 120 to 130° C. in the presence of a dehydrochlorination catalyst so that the primary monochloride derivative is present in the kettle product and the tertiary monochloride derivative is selectively dehydrochlorinated, introducing an inert diluent lower boiling than the lowest boiling hexene isomer to the dehydrochlorination effluent thus produced, and separating from said dehydrochlorination effluent mono-olefinic hydrocarbons.

7. A process according to claim 6 wherein the dehydrochlorination catalyst is barium chloride.

8. A process for producing mono-olefinic hydrocarbons which comprises chlorinating 2,3-dimethylbutane at a temperature of 40 to 55° C. and a molar ratio of hydrocarbon to chlorine within the range of 4:1 to 10:1, separating thus produced monochloride derivatives from more highly chlorinated derivatives of said hydrocarbon, separating the monochloride derivatives by fractionally distilling the mixture of same at a kettle temperature of at least 120° C. effecting concomitant selective dehydrochlorination of the tertiary monochloride derivative and distillation of resulting mono-olefinic hydrocarbons and hydrogen chloride as overhead product, and removing liquid unconverted primary monochloride derivative as kettle product, dehydrochlorinating primary monochloride derivative from said fractional distillation, and separating mono-olefinic hydrocarbons produced in the two dehydrochlorination steps.

9. A process for producing tetramethylethylene which comprises chlorinating 2,3-dimethylbutane at a temperature of 40 to 55° C. and a molar ratio of hydrocarbon to chlorine within the range of 4:1 to 10:1, separating thus produced monochloride derivatives from more highly chlorinated derivatives of said hydrocarbon, fractionally distilling said monochloride derivatives at a kettle temperature of 120 to 130° C. to separate the primary monochloride derivative from the tertiary monochloride derivatives and to selectively dehydrochlorinate said tertiary monochloride derivatives, dehydrochlorinating primary monochloride derivative thus separated at a temperature of 500 to 600° C., and recovering tetramethylethylene as a product of the process.

10. A process according to claim 9 wherein the dehydrochlorination of the primary monochloride derivative is effected at a temperature of 500 to 600° C. and in the presence of a dehydrochlorination catalyst.

11. A process according to claim 10 wherein the dehydrochlorination catalyst is anhydrous barium chloride.

12. A process for producing mono-olefinic hydrocarbons which comprises chlorinating 2,3-dimethylbutane at a temperature of 40 to 55° C. and a molar ratio of hydrocarbon to chlorine within the range of 4:1 to 10:1, separating thus produced monochloride derivatives from more highly chlorinated derivatives of said hydrocarbon, fractionally distilling said monochloride derivatives at a kettle temperature of 120 to 130° C. to separate the primary monochloride derivatives from the tertiary monochloride derivatives and to selectively dehydrochlorinate said tertiary monochloride derivatives, dehydrochlorinating primary monochloride derivative thus separated at a temperature of 500 to 600° C., introducing an inert diluent lower boiling than the lowest boiling hexene isomer to the effluents from the dehydrochlorination of the tertiary and primary monochloride derivatives, and separating from said dehydrochlorination effluents mono-olefinic hydrocarbons.

13. A process for producing tetramethylethylene which comprises chlorinating 2 3-dimethylbutane at a temperature of 40 to 55° C. and a molar ratio of hydrocarbon to chlorine within the range of 4:1 to 10:1, separating thus produced monochloride derivatives from more highly chlorinated derivatives of said hydrocarbon, fractionally distilling said monochloride derivatives at a kettle temperature of 120 to 130° C. to separate the primary monochloride derivatives from the tertiary monochloride derivatives and to selectively dehydrochlorinate said tertiary monochloride derivatives, dehydrochlorinating primary monochloride derivative thus separated at a temperature of 500 to 600° C. and in the presence of anhydrous barium chloride, introducing an inert diluent lower boiling than the lowest boiling hexene isomer to the effluents from the dehydrochlorination of the tertiary and primary monochloride derivative, separating from said dehydrochlorination effluents mono-olefinic hydrocarbons, and recovering tetramethylethylene as a product of the process.

14. A process for producing mono-olefinic hydrocarbons which comprises chlorinating 2,3-dimethylbutane at a temperature of 40 to 55° C. and a molar ratio of hydrocarbon to chlorine within the range of 4:1 to 10:1, separating thus produced monochloride derivatives from more highly chlorinated derivatives of said hydrocarbon, fractionally distilling said monochloride derivatives at a kettle temperature of 120 to 130° C. to separate the primary monochloride derivatives from the tertiary monochloride derivatives and to selectively dehydrochlorinate said tertiary monochloride derivatives, dehydrochlorinating primary monochloride derivative thus separated at a temperature of 500 to 600° C. and in the presence of anhydrous barium chloride, contacting the effluents from the dehydrochlorination of the tertiary and primary monochloride derivatives with 1-chloro-2,3-dimethylbutane, and separating from said dehydrochlorination effluents mono-olefinic hydrocarbons.

15. A process for producing tetramethylethylene which comprises chlorinating 2,3-dimethylbutane at a temperature of 40 to 55° C. and a molar ratio of hydrocarbon to chlorine within the range of 4:1 to 10:1, separating thus produced monochloride derivatives from more highly chlorinated derivatives of said hydrocarbon, fractionally distilling said monochloride derivatives at a kettle temperature of 120 to 130° C. to separate the primary monochloride derivatives from the tertiary monochloride derivatives and to selectively dehydrochlorinate said tertiary monochloride derivatives, dehydrochlorinating primary monochloride derivative thus separated at a temperature of 500 to 600° C. and in the presence of anhydrous barium chloride, contacting the effluents from the dehydrochlorination of the tertiary and primary monochloride derivatives with 1-chloro-2,3-dimethylbutane at a temperature of 35 to 50° C. to separate mono-olefinic hydrocarbon derivatives of 2,3-dimethylbutane from said effluent, and recovering tetramethylethylene as a product of the process.

DONALD R. BLUMER.

REFERENCES CITED

The following references are of record in the file of this patent:

UNITED STATES PATENTS

| Number | Name | Date |
|---|---|---|
| 1,975,456 | Hass et al. | Oct. 2, 1934 |
| 2,065,323 | Thomas et al. | Dec. 22, 1936 |
| 2,278,719 | Davis et al. | Apr. 7, 1942 |
| 2,314,335 | Frey | Mar. 23, 1943 |
| 2,368,446 | Buc | Jan. 30, 1945 |
| 2,404,927 | Schmerling et al. | July 30, 1946 |
| 2,419,500 | Peterson et al. | Apr. 22, 1947 |
| 2,436,491 | Schmerling et al. | Feb. 24, 1948 |
| 2,467,965 | Chenicek | Apr. 19, 1949 |